United States Patent
Jose et al.

(10) Patent No.: US 11,874,726 B2
(45) Date of Patent: Jan. 16, 2024

(54) IN-FLIGHT DETECTION OF SERVER TELEMETRY REPORT DRIFT

(71) Applicant: Dell Products L.P., Round Rock, TX (US)

(72) Inventors: Cyril Jose, Austin, TX (US); Vijayasimha Reddy Naga, Georgetown, TX (US); Michael Emery Brown, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 220 days.

(21) Appl. No.: 17/443,082

(22) Filed: Jul. 20, 2021

(65) Prior Publication Data

US 2023/0026041 A1 Jan. 26, 2023

(51) Int. Cl.
*G06F 11/07* (2006.01)
*G06F 16/907* (2019.01)
*G06F 8/71* (2018.01)
*G06F 11/30* (2006.01)

(52) U.S. Cl.
CPC ............ *G06F 11/0775* (2013.01); *G06F 8/71* (2013.01); *G06F 11/0778* (2013.01); *G06F 11/0787* (2013.01); *G06F 11/3086* (2013.01); *G06F 16/907* (2019.01)

(58) Field of Classification Search
CPC combination set(s) only.
See application file for complete search history.

(56) References Cited

U.S. PATENT DOCUMENTS

| 10,782,990 | B1* | 9/2020 | Suarez | G06F 11/301 |
| 11,436,122 | B1* | 9/2022 | Matham | G06F 11/3409 |
| 11,516,222 | B1* | 11/2022 | Srinivasan | H04L 41/0654 |
| 11,621,904 | B1* | 4/2023 | Matthews | H04L 43/10 |
| | | | | 709/241 |
| 2014/0012945 | A1* | 1/2014 | Barnhill, Jr. | H04L 12/2809 |
| | | | | 709/217 |
| 2018/0089328 | A1* | 3/2018 | Bath | G06F 16/24568 |
| 2019/0163546 | A1* | 5/2019 | Ungar | G06F 11/079 |
| 2019/0294485 | A1* | 9/2019 | Kukreja | G06F 11/0772 |
| 2020/0042373 | A1* | 2/2020 | Przestrzelski | G06F 11/0709 |
| 2020/0099773 | A1* | 3/2020 | Myers | H04L 67/34 |
| 2020/0304367 | A1* | 9/2020 | Berdy | H04L 12/2803 |
| 2021/0392186 | A1* | 12/2021 | Alshawabkeh | G06F 11/3034 |
| 2021/0398235 | A1* | 12/2021 | Dixit | G06F 16/254 |

* cited by examiner

*Primary Examiner* — Robert W Beausoliel, Jr.
*Assistant Examiner* — Susan F Rayyan
(74) *Attorney, Agent, or Firm* — Norton Rose Fulbright US LLP (57) ABSTRACT

A first information handling system may receive a telemetry metric report from a client information handling system. The first information handling system may determine that one or more characteristics of the telemetry metric report do not match one or more predetermined telemetry metric report characteristics. The first information handling system may perform one or more corrective actions based, at least in part, on the determination that the one or more characteristics of the telemetry metric report do not match one or more predetermined telemetry metric report characteristics.

20 Claims, 7 Drawing Sheets

IN-FLIGHT DETECTION OF SERVER TELEMETRY REPORT DRIFT

FIELD OF THE DISCLOSURE

The present disclosure generally relates to information handling systems, and more particularly relates to chassis sled layout determination in information handling systems.

BACKGROUND

As the value and use of information increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

Information handling systems may monitor and collect data from one or more client information handling systems. For example, a client information handling system may aggregate data regarding operation of the client information handling system and may report the aggregated data to a managing information handling system. Such data may, for example, include telemetry data, such as an amount of power consumed by the client information handling system, an amount of data processed by the client information handling system, an uptime of the client information handling system, temperature data regarding a temperature of the client information handling system, data regarding components of the client information handling system, and other data regarding the client information handling system.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An information handling system may analyze incoming telemetry metric reports from one or more client information handling systems to detect in-flight drift of telemetry metric report contents, which may be evidenced by one or more characteristics of a received telemetry metric report that do not match one or more predetermined characteristics. For example, an information handling system receiving telemetry metric reports from one or more client information handling systems may analyze the reports to determine if the content and/or formatting of the reports comply with one or more predetermined characteristics. If the content and/or formatting of received telemetry metric reports do not comply with the predetermined characteristics, the information handling system may instruct client information handling systems to perform one or more corrective actions, such as overriding user-input telemetry metric report characteristics to implement the one or more predetermined characteristics. Verification that telemetry metric report characteristics match predetermined telemetry metric report characteristics may allow the information handling system to detect tampering with telemetry metric reports and to avoid misinterpretation of information included in the telemetry metric report. Furthermore, transmission of corrective action instructions may allow client information handling systems to adjust telemetry metric report characteristics to match the predetermined telemetry metric report characteristics to avoid transmission of extraneous information, reducing a network burden, and to avoid misinterpretation of telemetry metric information that is transmitted or loss of telemetry metric data that was expected but was not included in the telemetry metric report. Thus, monitoring for telemetry metric report drift and performing one or more corrective actions in response to detected telemetry metric report drift may enhance a user experience and system security by reducing network traffic and/or enabling detection of potential metric report tampering.

A first information handling system may perform a method to determine if characteristics of a received telemetry metric report match predetermined characteristics and to perform one or more corrective actions if they do not. For example, a method may begin with receiving, by a first information handling system, a telemetry metric report from a client information handling system. The telemetry metric report may include a variety of telemetry data regarding operation of the client information handling system, such as an amount of power consumed by the client information handling system, an amount of data processed by the client information handling system, an uptime of the client information handling system, temperature data regarding a temperature of the client information handling system, data regarding components of the client information handling system, band series metrics regarding a status of the client information handling system, and other data regarding the client information handling system. In some embodiments, the telemetry metric report may also include a firmware version of a firmware of the client information handling system and/or a telemetry metric format indicator. The telemetry metric format indicator may indicate one or more characteristics of the telemetry metric report, such as types of information included in the telemetry metric report, an organization of information included in the telemetry metric report, and other information regarding the information included in the telemetry metric report. The telemetry metric format indicator may, for example, be an alphanumeric value representing one or more characteristics of the telemetry metric report. The telemetry metric report may be a portion of a telemetry metric data stream. For example, the client information handling system may stream telemetry metric information to the first information handling system, and the telemetry metric report may be a portion of the stream.

The first information handling system may determine that one or more characteristics of the received telemetry metric report do not match one or more predetermined telemetry metric report characteristics. The characteristics of the telemetry metric report may, for example, include types of information included in the telemetry metric report, an organization or format of information included in the telemetry metric report, and other information regarding the information included in the telemetry metric report. In some embodiments, first information handling system may compare one or more characteristics of the telemetry metric report, such as types of telemetry metric information included in the telemetry metric report, with one or more predetermined characteristics for the telemetry metric report, such as one or more types of data that should be included in the telemetry metric report. If a type of data that is to be included in the telemetry metric report, as indicated by the predetermined characteristics, is not included in the telemetry metric report, or if a type of data that is not to be included in the telemetry metric report, as indicated by the predetermined characteristics, is included in the telemetry metric report, a determination may be made that one or more characteristics of the telemetry metric report do not match the one or more predetermined characteristics. In some embodiments, the first information handling system may determine that the telemetry metric report characteristics and the predetermined characteristics do not match by comparing a telemetry metric format indicator included in the telemetry metric report with a stored telemetry metric format indicator. A difference between the telemetry metric format indicator of the report and the stored telemetry metric format indicator may indicate one or more differences between the characteristics of the received telemetry metric report and the one or more predetermined characteristics. The telemetry metric format indicator of the report and the stored telemetry metric format indicator may, in some embodiments, include one or more strings of alphanumeric characters representing one or more characteristics of the telemetry metric report and one or more predetermined characteristics, respectively. In some embodiments, a firmware version indicator indicating a firmware version of the client information handling system may be extracted from the telemetry metric report. The firmware version indicator may be used to select a stored telemetry metric format indicator for comparison against the received telemetry metric format indicator. For example, different firmware versions may allow for collection and transmission of different telemetry metric information in a telemetry metric report. Thus, the telemetry metric format indicator included in the telemetry metric report may differ based on the firmware version of the client information handling system, and a stored telemetry metric format indicator may be selected for comparison against the received telemetry metric format indicator based, at least in part, on the firmware version. In some embodiments the step of detecting may be performed by a plug-in of a console application executed by the first information handling system.

The first information handling system may perform one or more corrective actions based, at least in part, on the determination that the one or more characteristics of the telemetry metric report do not match one or more predetermined telemetry metric report characteristics. Such corrective action may include notifying a user of at least one of the first information handling system or the client information handling system that one or more characteristics of the telemetry metric report do not match one or more predetermined telemetry metric report characteristics or instructing the client information handling system to implement telemetry metric report characteristics that match the one or more predetermined characteristics. Notifying a user that the telemetry metric report characteristics do not match the predetermined characteristics may inform the user that the telemetry metric report may have been tampered with. Instructing the client information handling system to implement telemetry metric report characteristics that match the one or more predetermined telemetry metric report characteristics may include transmitting instructions to the client information handling system instructing the client information handling system to adjust one or more telemetry metric report settings, which govern the one or more characteristics of the telemetry metric report.

A client information handling system may generate a telemetry metric report for a first information handling system and may implement corrective action instructions received from the first information handling system based on the telemetry metric report. A client information handling system may generate a telemetry metric report for a first information handling system based, at least in part, on telemetry data collected by the client information handling system. The client information handling system may transmit the telemetry metric report to the first information handling system. The telemetry metric report may include a telemetry metric format indicator. In some embodiments, the telemetry metric format indicator representing the one or more characteristics of the telemetry metric report may be determined by the client information handling system. The telemetry metric format indicator may be determined by the client information handling system based on one or more telemetry metric report settings of the client information handling system and may thus represent the one or more characteristics of the telemetry metric report. The telemetry metric format indicator may, for example, be an alphanumeric value, with a different telemetry metric format indicator indicating each possible combination of telemetry metric report characteristics. The telemetry metric format indicator may be included in and transmitted with the telemetry metric report. A firmware version may also be included in the telemetry metric report.

In response to the transmission of the telemetry metric report, the client information handling system may receive from the first information handling system one or more corrective action instructions for adjusting one or more characteristics of the telemetry metric report. For example, if one or more characteristics of the telemetry metric report did not match one or more predetermined characteristics stored by the first information handling system, the first information handling system may transmit one or more corrective action instructions to the client information handling system, and the client information handling system may receive the instructions.

The client information handling system may then implement the one or more received corrective action instructions. In some embodiments, the client information handling system may transmit a second telemetry metric report having one or more characteristics adjusted based, at least in part, on the received corrective action instructions. For example, the received corrective action instructions may specify one or more changes to one or more telemetry metric report settings that govern one or more characteristics of generated telemetry metric reports. In response to the received corrective action instructions, the client information handling system may adjust the one or more telemetry metric report settings governing one or more characteristics of telemetry metric reports. Then, after the settings are adjusted, subsequently generated and transmitted telemetry metric reports may have the one or more characteristics specified by the received corrective action instructions.

In some embodiments, the client information handling system may receive a message including one or more predetermined characteristics for the telemetry metric report. For example, during transmission of a telemetry metric stream or before transmission of the first telemetry metric data, the first information handling system may transmit an instruction to a client information handling system instructing the client information handling system to implement one or more predetermined characteristics in generated telemetry metric reports. The client information handling system may adjust one or more telemetry metric report settings for generation of the telemetry metric report based, at least in part, on the received predetermined characteristics for the telemetry metric report. For example, the one or more characteristics of the telemetry metric report may be based, at least in part, on the telemetry metric report settings. Thus, adjusting the telemetry metric report settings, as instructed by the first information handling system, may cause the client information handling system to generate telemetry metric reports that have characteristics that match the one or more predetermined characteristics. Thus, telemetry metric reports transmitted after such an adjustment and before any other adjustments to telemetry metric report settings may have characteristics that match the predetermined characteristics.

The client information handling system may also receive user input, or other input, identifying one or more changes to the one or more telemetry metric report settings that were previously adjusted based on the received predetermined characteristics. For example, a user may adjust one or more telemetry metric report settings such that one or more characteristics of the telemetry metric reports generated by the client information handling system after the user's adjustment will differ from the one or more predetermined characteristics. The client information handling system may then adjust the one or more telemetry metric report settings based, at least in part, on the user input. The generated telemetry metric report transmitted to the client information handling system that is determined to have characteristics different from the predetermined characteristics may thus be a telemetry metric report generated based, at least in part, on the adjustment to the one or more telemetry metric settings made based on the user input. Thus, user input adjusting telemetry metric report settings, such as telemetry metric report definitions, may cause telemetry metric report drift, and a first information handling system may instruct the client information handling system to take corrective action.

In some embodiments, an information handling system may include a memory and a processor for performing the methods described herein. A computer program product may include a non-transitory computer-readable medium including instructions for causing an information handling system to perform the method described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application. The teachings can also be used in other applications and with several different types of architectures.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
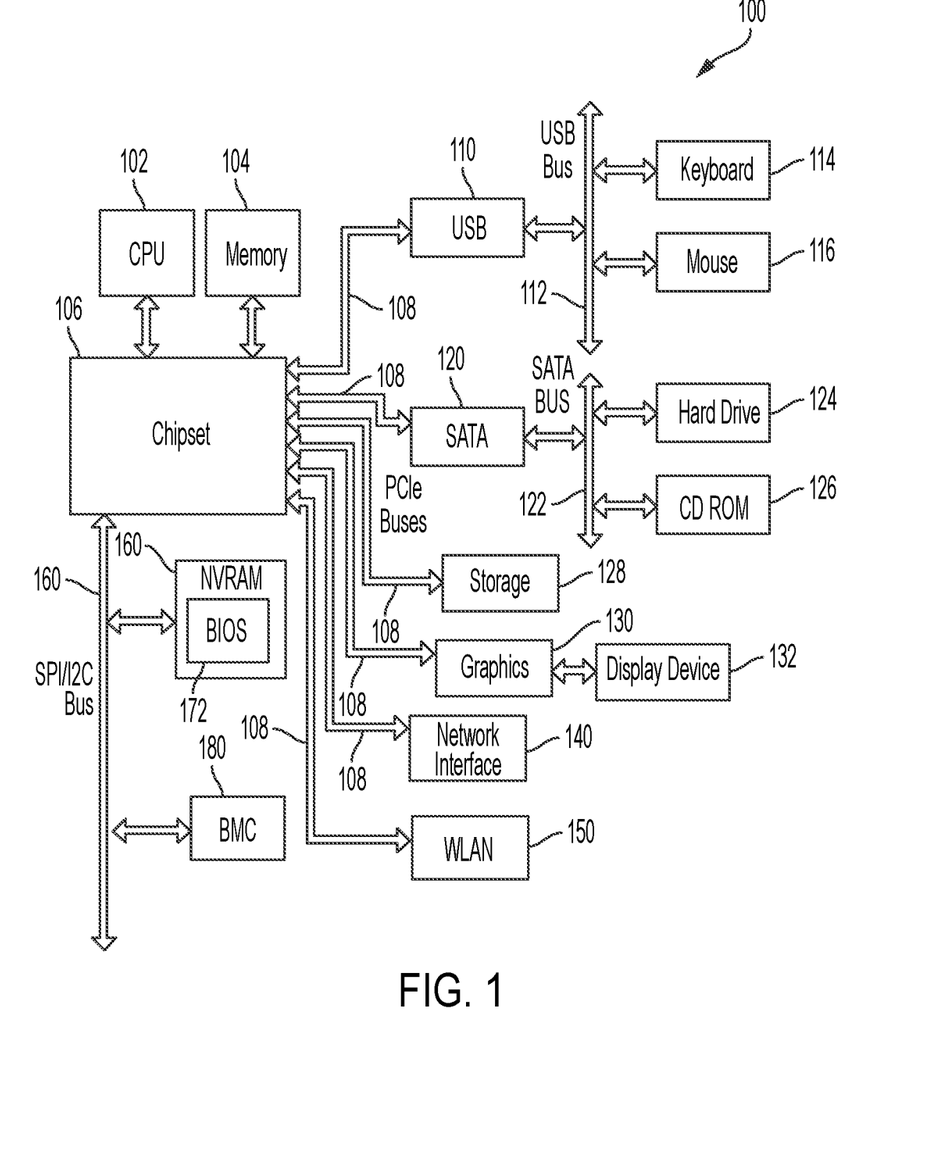
FIG. 1 is a block diagram of an example information handling system according to some embodiments of the disclosure.

FIG. 1 illustrates an example information handling system 100. Information handling system 100 may include a processor 102, a memory 104, a chipset 106, one or more PCIe buses 108, a universal serial bus (USB) controller 110, a USB bus 112, a keyboard device controller 114, a mouse device controller 116, a configuration a SATA bus controller 120, a SATA bus 122, a hard drive device controller 124, a compact disk read only memory (CD ROM) device controller 126, a storage 128, a graphics device controller 130, a network interface controller (NIC) 140, a wireless local area network (WLAN) or wireless wide area network (WWAN) controller 150, a serial peripheral interface (SPI) bus 160, a NVRAM 170 for storing BIOS 172, and a baseboard management controller (BMC) 180. In one example embodiment, chipset 106 may be directly connected to an individual end point via a PCIe root port within the chipset and a point-to-point topology as shown in FIG. 1. BMC 180 may be referred to as a service processor or embedded controller (EC). Capabilities and functions provided by BMC 180 may vary considerably based on the type of information handling system. For example, the term baseboard management system may be used to describe an embedded processor included at a server, while an embedded controller may be found in a consumer-level device. As disclosed herein, BMC 180 represents a processing device different from CPU 102, which provides various management functions for information handling system 100. For example, an embedded controller may be responsible for power management, cooling management, and the like.

System 100 may include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 may be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally may provide an abstraction layer for the hardware, such as a consistent way for application programs and operating systems to interact with the keyboard, display, and other input/output devices. When power is first applied to information handling system 100, the system may begin a sequence of initialization procedures. During the initialization sequence, also referred to as a boot sequence, components of system 100 are configured and enabled for operation, and device drivers may be installed. Device drivers may provide an interface through which other components of the system 100 can communicate with a corresponding device.

Information handling system 100 may include additional components and additional busses, not shown for clarity. For example, system 100 may include multiple processor cores, audio devices, and the like. While a particular arrangement of bus technologies and interconnections is illustrated for the purpose of example, one of skill will appreciate that the techniques disclosed herein are applicable to other system architectures. System 100 may include multiple CPUs and redundant bus controllers. One or more components may be integrated together. For example, portions of chipset 106 can be integrated within CPU 102. Additional components of information handling system 100 may include one or more storage devices that may store machine-executable code, one or more communications ports for communicating with external devices, and various input and output (I/O) devices, such as a keyboard, a mouse, and a video display.

Figure 2:
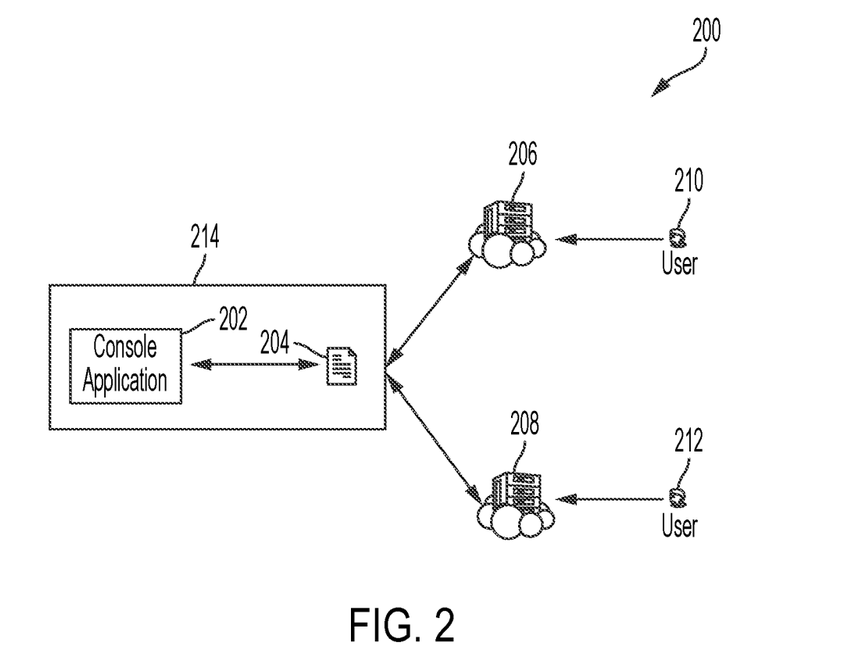
FIG. 2 is an illustration of an example system for telemetry metric report management according to some embodiments of the disclosure.

A first information handling system, such as a managing information handling system, may receive telemetry metric reports from one or more client information handling systems detailing operation of the one or more client information handling systems. An example system 200 for telemetry metric data collection and analysis is shown in FIG. 2. A console application 202 may be a console application of a first information handling system 214 and may be configured to monitor one more client information handling systems. For example, the console application may receive telemetry metric reports from one or more client information handling systems, such as a first client information handling system 206 and a second client information handling system 208. Telemetry metric reports received by the console application 202 of the first information handling system 214 from client information handling systems 206, 208 may, for example, include telemetry metric data regarding operation of the client information handling systems 206, 208. Telemetry metric data included in telemetry metric reports may, for example, include an amount of power consumed by the client information handling system, an amount of data processed by the client information handling system, an uptime of the client information handling system, temperature data regarding a temperature of the client information handling system, data regarding components of the client information handling system, and other data regarding the client information handling system. For example, telemetry metric reports may include thermal metric data regarding thermal performance of the client information handling systems 206, 208, such as a computing power consumption, a power supply unit efficiency, a power utilization efficiency, such as a ratio of total system power consumption to computing power consumption, a power to cool ratio, such as a quotient of fan power divided by a system power ratio, a system air flow efficiency, a system air flow per unit of system fan power consumption, a system air flow per unit of system input power consumption, a system air flow utilization, a net airflow of the information handling system, a temperature difference between inlet air temperature and exhaust air temperature of the information handling system, a total amount of heat dissipated from a power supply unit of the information handling system as a result of an inefficiency of the power supply unit, and other temperature metrics. Telemetry metric data may, for example, include sensor data collected from sensors of the client information handling system, such as sensed temperature, voltage, current, humidity, and other data.

In some embodiments, telemetry metric data may be transmitted from the client information handling systems 208, 210 to the console application 202 of the first information handling system 214, upon request for a telemetry metric report by the first information handling system 214. In some embodiments, telemetry metric data may be transmitted from the client information handling systems 206, 208 to the console application 202 of the first information handling system 214 in a telemetry metric data stream. For example, a telemetry metric report received from either the first client information handling system 206 or the second client information handling system 208 may be a portion of a telemetry metric data stream from the client information handling system. The first and second client information handling systems 206, 208 may be local information handling systems, such as servers in a local data center, or remote cloud-based information handling systems, such as one or more remote servers. While two client information handling systems 206, 208 are shown, a managing information handling system may receive telemetry metric reports from greater than or fewer than two client information handling systems.

In some embodiments, the console application 202 of the first information handling system 214 may specify one or more characteristics of telemetry metric reports to be implemented by the client information handling systems 206, 208. For example, the console application 202 may generate a metric report definition digest 204 specifying one or more telemetry report metric definitions indicating characteristics of telemetry metric data to be transmitted from the client information handling systems 206, 208 to the information handling system. The metric report definition digest 204 may, for example, be a text file or an alphanumeric string specifying one or more metric report definitions for characteristics of telemetry metric data to be included in telemetry metric reports from the client information handling systems 206, 208. Telemetry metric report characteristics may include types of data included or not included in a telemetry metric report, such as temperature data, system uptime data, power consumption data, and other telemetry metric data included in a telemetry metric report, formatting of a telemetry metric report, such as formatting of telemetry metric data in a telemetry metric report, metadata included in a telemetry metric report, trigger conditions for transmission of telemetry metric reports, an order of data included in a telemetry metric report, and other characteristics of telemetry metric reports. In some embodiments, the metric report definition digest 204 may be an integral metric report definition digest. For example, the metric report definition digest may specify one or more integral metric report definitions. Integral metric report definitions may be core metric report definitions specifying telemetry metric data that should be included in a telemetry metric report or formatting of the telemetry metric report that is required and/or monitored for by a managing information handling system upon receipt of the telemetry metric report. For example, the integral metric report definitions may specify one or more characteristics of the telemetry metric report that are monitored for by the managing information handling system. Integral metric report definitions may be included in and/or indicated by the telemetry metric report definition digest 204. The telemetry metric report definition digest 204 may also include and/or indicate optional metric report definitions. In some embodiments, optional metric report definitions specify telemetry metric data and/or formatting that may be included in telemetry metric reports, but may not be monitored for by the console application 202 of the first information handling system 214. In some embodiments, integral metric report definitions may include configuration settings for telemetry metric reports that influence structure and content of the report, while optional metric report definitions may include metadata information, such as metric report transmission trigger settings, that do not influence the contents of telemetry metric reports. In some embodiments, the telemetry metric report definition digest 204 may be generated by the first information handling system 214 based on user input received via the console application 202 of the first information handling system 214 or may be generated automatically based on upstream requirements. The telemetry metric report definition digest may be stored by the first information handling system 214. Thus, the console application 202 and the telemetry metric report definition digest 204 may both reside in the first information handling system 214. In some embodiments, different telemetry metric report definition digests may be generated for different information handling systems or different firmware versions. For example, different telemetry metric report definition digests may be generated for different firmware versions run by different client information handling systems. In some embodiments, the telemetry metric report definition digest 204 may be a telemetry metric format indicator specifying one or more characteristics of the telemetry metric reports to be generated by the client information handling systems 206, 208. The telemetry metric format indicator may, for example, be an alphanumeric string of characters representing one or more telemetry metric report characteristics, such as one or more integral report definitions, that should be implemented by client information handling systems in generation of telemetry metric reports. For example, the metric report definition digest 204 may be a telemetry metric format indicator and may be an alphanumeric indicator representing one or more predetermined telemetry metric report characteristics.

The telemetry metric report definition digest 204 may be transmitted to the client information handling systems 206, 208. For example, a forwarder plugin of the console application 202 may configure a single telemetry metric report definition digest 204 for the client information handling systems 206, 208 or different telemetry metric report definition digests for each client information handling system 206, 208 and may transmit the telemetry metric report definition digests to the client information handling systems 206, 208. The client information handling systems 206, 208 may receive and implement the telemetry metric report definition digest 204. For example, client information handling system 206 may receive the telemetry metric report definition digest 204 and may determine one or more telemetry metric report definitions based on the telemetry metric report definition digest 204. The client information handling system 206 may implement one or more definitions indicated by the digest, such as by adjusting one or more telemetry metric report settings for generation of telemetry metric reports based on the received definitions. Adjusting such settings may adjust one or more characteristics of generated telemetry metric reports to reflect the one or more telemetry metric report characteristics specified by the definitions of the digest 204. For example, the client information handling system 206 may begin to incorporate a specific type of data, such as sensed thermal data, in telemetry metric reports.

After the definitions indicated by the digest 204 are implemented, the client information handling systems 204 may begin transmitting telemetry metric reports to the first information handling system 214, such as to the console application 202, of the first information handling system 214. The console application may analyze received telemetry metric reports to determine if one or more characteristics of the received telemetry metric reports match one or more predetermined telemetry metric report characteristics specified by the telemetry metric report definition digest(s) 204, saved for the client information handling systems 206, 208. For example, if a first user 210 of the first client information handling system 206 or a second user 212 of the second information handling system 208, adjusted one or more telemetry metric report settings of the first client information handling system 206 to be different from the telemetry metric report settings specified by the telemetry metric report definition digest 204, such as to include one or more characteristics in a telemetry metric report that differ from one or more characteristics specified by integral report definitions of the telemetry metric report definition digest, one or more characteristics of the received telemetry metric report may differ from one or more predetermined telemetry metric report characteristics specified by the telemetry metric report definition digest.

If one or more characteristics of the received telemetry metric report differ from one or more predetermined characteristics, such as one or more integral characteristics specified by integral report definitions, the console application 202 of the first information handling system 214 may perform one or more corrective actions. A difference between actual characteristics of a telemetry metric report and predetermined telemetry metric report characteristics may be referred to as telemetry report drift. As one example of corrective action, console application 202 may notify a user of the difference. As another example of corrective action, console application 202 may instruct the client information handling system that transmitted the report having the different characteristics to implement one or more telemetry metric definitions, such as one or more telemetry metric definitions that specify the one or more predetermined characteristics, and the client information handling system may implement the telemetry metric definitions. For example, the first information handling system 214 may override the user input received by the client information handling system and may cause the client information handling system to adjust telemetry metric report settings based on the predetermined characteristics. In some embodiments, the client information handling system may retransmit the telemetry metric report definition digest 204 to the client information handling system instructing the client information handling system to implement the definitions of the digest 204. Thus, a console application 202 of a first information handling system 214 may monitor telemetry metric data received from client information handling systems and may perform one or more corrective actions upon detection of telemetry metric report drift.

In some embodiments, the console application 202 may include a forwarder plugin and may forward telemetry metric data received from the client information handling systems 206, 208 from the first information handling system 214 to a remote information handling system, such as to a database of telemetry metric data. In some embodiments the first information handling system 214 may forward only telemetry metric data from telemetry metric reports that have characteristics that match the predetermined telemetry metric report characteristics.

Figure 3:
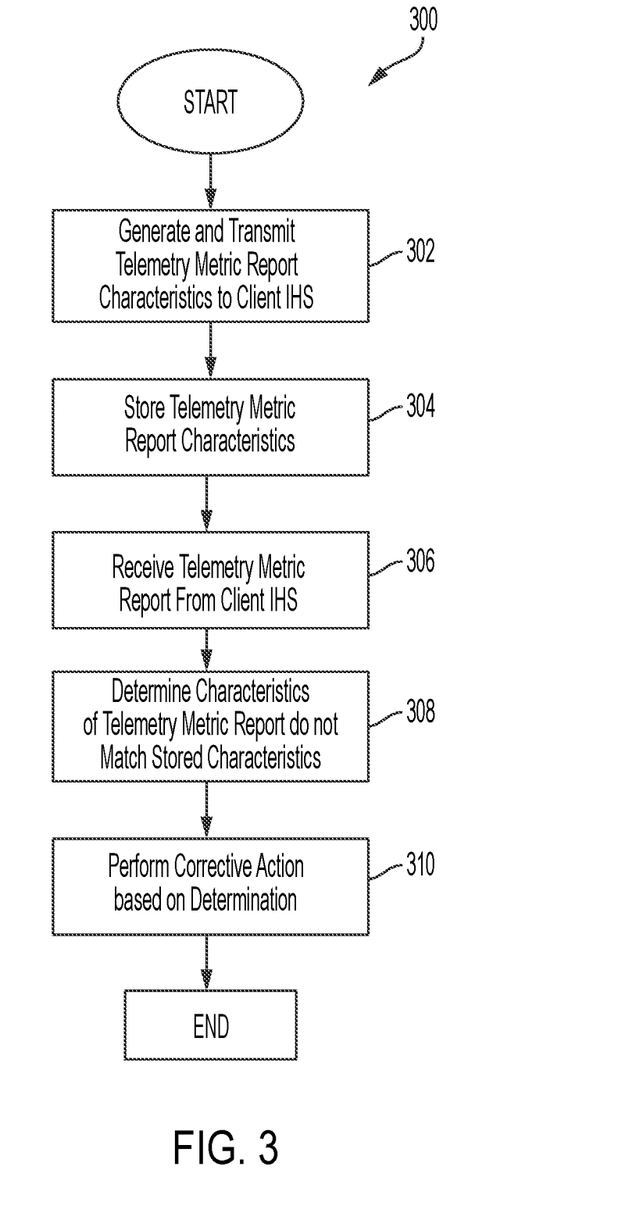
FIG. 3 is a flow chart diagram of an example method for receipt and analysis of a telemetry metric report by an information handling system according to some embodiments of the disclosure.

A first information handling system, such as a managing information handling system may receive telemetry metric reports from one or more client information handling systems. An example method 300 for managing a client information handling system by a first information handling system is shown in FIG. 3. The method 300 may, in some embodiments, be performed by a console application executed by the first information handling system. At step 302, the first information handling system may generate and transmit one or more telemetry metric report characteristics to the client information handling system. In some embodiments, generation and transmission of telemetry metric report characteristics may include generation of a telemetry metric report definition digest indicating one or more telemetry metric definitions for the client information handling system. In some embodiments the telemetry metric definition digest may include at least one of integral metric definitions or optional metric definitions. The telemetry metric definitions may specify one or more telemetry metric report characteristics of the telemetry metric reports to be generated by the client information handling system. In some embodiments, the telemetry metric report definition digest may be generated based, at least in part, on a firmware version of a firmware of the client information handling system. In some embodiments, the first information handling system may generate multiple telemetry metric definition digests, with each digest corresponding to a different firmware version and/or a different client information handling system. The telemetry metric report definition digest may be generated based on higher level input, such as user input, or automatically based on higher level parameters. Telemetry metric report characteristics indicated by the telemetry metric report definition digest may, for example, specify data to be included in a telemetry metric report or one or more formatting aspects of the telemetry metric report. For example, telemetry metric report definitions may indicate that temperature telemetry data be included in the report and that temperature data be included in a first slot of the report.

At step 304, the first information handling system may store the telemetry metric report characteristics. For example, the first information handling system may store the generated telemetry metric report definition digest and may associate the telemetry metric report definition digest with the client information handling system to which the telemetry metric report definition digest was sent.

At step 306, the first information handling system may receive a telemetry metric report from the client information handling system. In some embodiments, the method may begin at step 306 without or prior to generation, transmission, and storage of telemetry metric report characteristics as described with respect to steps 302-304, and the client information handling system may generate a telemetry metric report using default telemetry metric report definitions. The telemetry metric report may include telemetry metric data regarding operation of the client information handling system, such as temperature telemetry metric data, usage telemetry metric data, power consumption telemetry metric data, and other telemetry metric data. In some embodiments, the telemetry metric report may be part of a data stream of telemetry metric data received by the first information handling system from the client information handling system. In some embodiments, the telemetry metric report may be received by the first information handling system in response to a request for telemetry metric data by the first information handling system. In some embodiments, one or more characteristics of the telemetry metric report may be set, based at least in part, based on the telemetry metric report characteristics transmitted by the first information handling system at step 302.

At step 308, the first information handling system may determine that one or more characteristics of the telemetry metric report do not match one or more predetermined telemetry metric report characteristics, such as the one or more characteristics stored at step 304. For example, the first information handling system may compare at least a portion of the telemetry metric report with the predetermined telemetry metric report characteristics to determine if the characteristics match. In some embodiments, the characteristics that are compared against predetermined characteristics may include characteristics specified by integral report definitions. For example, the telemetry metric report may be examined to determine if the report includes data or formatting that is required by the first information handling system, such as data or formatting specified in the characteristics generated and transmitted at step 302. For example, if a user of the client information handling system adjusted telemetry metric report definitions and thus telemetry metric report characteristics to deviate from predetermined telemetry metric report definitions and predetermined telemetry metric report characteristics, a determination may be made that the characteristics of the telemetry metric report do not match the predetermined characteristics. Such a determination may indicate that metric report definitions have been tampered with either at the client information handling system or in-flight.

At step 310, the first information handling system may perform one or more corrective actions based on the determination that the one or more characteristics of the client information handling system do not match the predetermined characteristics. For example, the first information handling system may notify a user of the first information handling system or the client information handling system of drift in the telemetry metric report definitions. In some embodiments, the first information handling system may transmit instructions to the client information handling system instructing the client information handling system to change one or more characteristics of the telemetry metric reports generated by the client information handling system to match the one or more predetermined characteristics. For example, the first information handling system may retransmit the telemetry metric report characteristics, such as the telemetry metric definition digest, generated and transmitted at step 302. The first information handling system may, for example, instruct the client information handling system to adjust one or more telemetry metric report settings for generation of future telemetry metric reports to comply with the predetermined telemetry metric report characteristics. In some embodiments, the first information handling system may instruct the client information handling system to implement the predetermined characteristics in future telemetry metric reports, overriding user input specifying different telemetry metric report characteristics. In some embodiments, such corrective action may reduce an amount of extraneous information transmitted in telemetry metric reports, by instructing the client information handling system to remove telemetry metric data not required to be included by the predetermined characteristics and/or may prevent loss of telemetry metric data by instructing the client information handling system to include telemetry metric data that was expected by the first information handling system but was not included in the telemetry metric report.

In some embodiments, a determination that one or more characteristics of a telemetry metric report do not match one or more predetermined telemetry metric report characteristics may be made based, at least in part, at least one of a telemetry metric format indicator and a firmware version of a telemetry metric report. The method 400, of FIG. 4, may begin, at step 402, with extracting, by the first information handling system, a firmware version from a telemetry metric report. For example, a firmware version of the client information handling system may be included in the telemetry metric report and may be extracted by the client information handling system. The firmware version may, for example, be an edge firmware version of the client information handling system.

Figure 4:
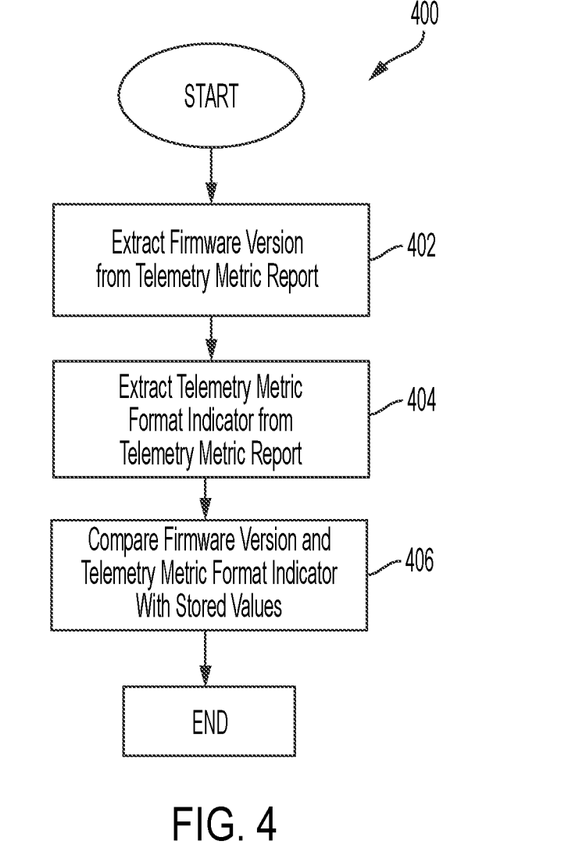
FIG. 4 is a flow chart diagram of an example method for extraction and comparison of telemetry metric format indicators according to some embodiments of the disclosure.

At step 404, the first information handling system may extract a telemetry metric format indicator from the telemetry metric report. The telemetry metric format indicator may indicate one or more characteristics of the telemetry metric report, such as by indicating one or more telemetry metric definitions that were used in generating the telemetry metric report. For example, the telemetry metric format indicator may be an alphanumeric value generated based on one or more characteristics of the telemetry metric report, such as one or more integral report definitions, that indicates the one or more characteristics of the telemetry metric report. In some embodiments, the telemetry metric format indicator may be generated based on one or more integral report definitions used by the client information handling system in generating the telemetry metric report. In some embodiments, the firmware version and the telemetry metric format indicator may both be included in a separate section of the telemetry metric report.

At step 406, the first information handling system may compare the firmware version and the telemetry metric format indicator with stored values. In some embodiments, the first information handling system may compare only the firmware version with stored values or only the telemetry metric format indicator. In some embodiments, the telemetry metric format indicator may be compared with a predetermined telemetry metric format indicator generated based, at least in part, on the telemetry metric report characteristics stored at step 304 of the method 300. For example, a specific alphanumeric character representing one or more telemetry metric report characteristics may be generated at step 302, stored at step 304, and compared against a received alphanumeric character representing characteristics of a received telemetry metric report. In some embodiments, a predetermined telemetry metric format indicator stored by the first information handling system may be selected for comparison against the telemetry metric format indicator of the received telemetry metric report based, at least in part, on a firmware version of the client information handling system. For example, a client information handling system may have telemetry data collection capabilities that differ based on a firmware version of the client information handling system. Thus, if a firmware version of the client information handling system is adjusted following transmission of the telemetry metric report characteristics at step 302 of the method 300 telemetry metric report characteristics of the telemetry metric report received at step 306 may differ from the predetermined telemetry metric report characteristics based on enhanced telemetry metric data gathering enabled by the firmware update. In some embodiments, the first information handling system may have multiple predetermined telemetry metric format indicators stored that are each associated with a different firmware, and thus the received telemetry metric format indicator may be compared with one of the predetermined telemetry metric format indicators based, at least in part, on the firmware version of the client information handling system. In some embodiments, the corrective actions performed at step 310 may include transmitting updated telemetry metric report definitions, indicating updated telemetry metric report characteristics, from the first information handling system to the client information handling system based, at least in part, on the firmware version of the client information handling system. For example, if the first information handling system determines that the client information handling system now has enhanced telemetry metric data gathering abilities based on a firmware version update, the first information handling system may instruct the client information handling system to implement telemetry metric report characteristics that take advantage of and/or incorporate the enhanced telemetry metric data gathering abilities of the client information handling system.

A client information handling system may generate telemetry metric reports for a first information handling system, such as a managing information handling system. For example, the steps of method 500 of FIG. 5 may be performed by a client information handling system along with or in response to performance of the steps of methods 300 of FIG. 3 and 400 of FIG. 4. The method 500 may begin, at step 502, with receipt of telemetry metric report characteristics by a client information handling system. For example, the client information handling system may receive telemetry metric report characteristics transmitted by a first information handling system at step 302 of the method 300. Receipt of telemetry metric report characteristics may, for example, include receipt of a telemetry metric report definition digest indicating one or more telemetry metric report definitions. The one or more telemetry metric report definitions may indicate one or more telemetry metric report characteristics.

Figure 5:
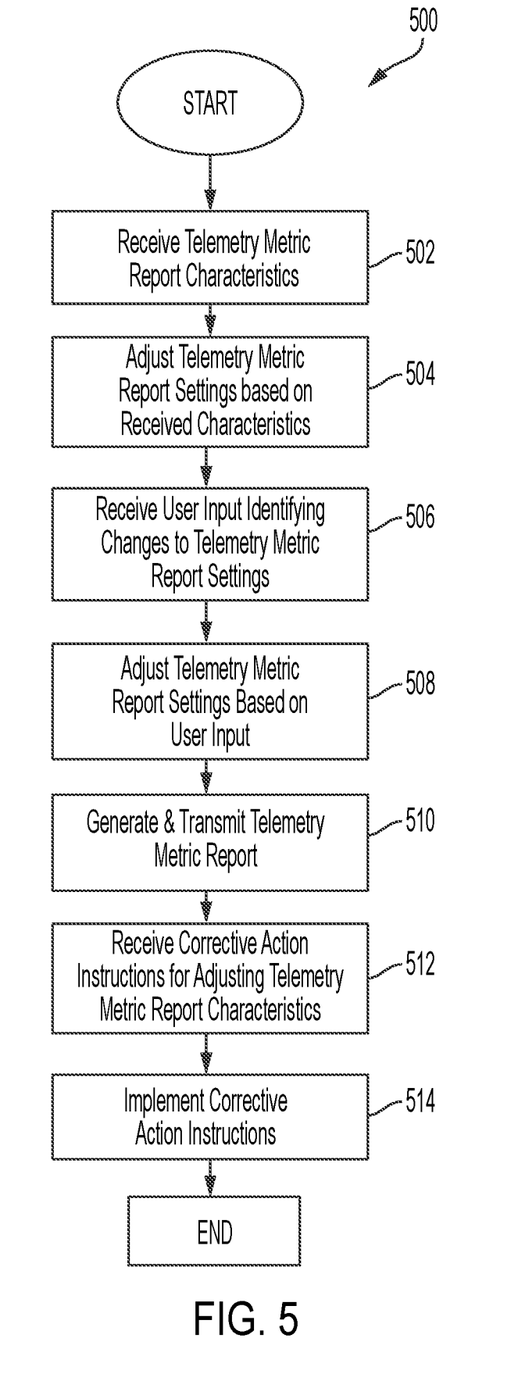
FIG. 5 is a flow chart diagram of an example method for generation and transmission of a telemetry metric report by a client information handling system according to some embodiments of the disclosure.

At step 504, the client information handling system may adjust one or more telemetry metric report settings based, at least in part, on the received telemetry metric report characteristics. Adjusting the telemetry metric report settings may, for example, include implementing one or more telemetry metric report definitions identified by the received telemetry metric report characteristics. Adjusting the telemetry metric report settings may cause telemetry metric reports generated following adjustment of the settings to include generation of telemetry metric reports having the one or more received telemetry metric report characteristics.

At step 506, the client information handling system may receive user input identifying changes to one or more telemetry metric report settings. For example, a user of the client information handling system may adjust one or more telemetry metric report definitions to be different from one or more telemetry metric report definitions received at step 502. In some embodiments, a user may manually adjust one or more telemetry metric report settings to cause generation of telemetry metric reports having characteristics deviating from the telemetry metric report characteristics received at step 502. At step 508, the client information handling system may adjust the one or more telemetry metric report settings based on the received user input. Thus, telemetry metric reports generated before such an adjustment may have the one or more characteristics received from the first information handling system at step 502, while telemetry metric reports generated after the adjustment at step 508 may have one or more characteristics that differ from the telemetry metric report characteristics received at step 502.

At step 510, the client information handling system may generate and transmit a telemetry metric report. For example, the client information handling system may generate and transmit a telemetry metric report having one or more characteristics that differ from predetermined characteristics transmitted to the client information handling system at step 302 of FIG. 3. In some embodiments, generation and transmission of a telemetry metric report may be a continuous process, such as generation and transmission of a telemetry metric data stream. The telemetry metric report may be generated using telemetry metric report settings that were adjusted based on the received user input specifying changes to the telemetry metric report settings. Thus, the telemetry metric report may have characteristics that differ from the one or more predetermined characteristics of the first information handling system. The telemetry metric report transmitted by the client information handling system at step 510 may be the telemetry metric report received by the first information handling system at step 306.

The telemetry metric report may, for example, be a distributed management task force (DMTF) standard compliant telemetry metric report. In some embodiments the standard-specified telemetry metric report may be adjusted to include information specifying a firmware of the telemetry metric report and/or a telemetry metric report definition digest, such as a telemetry metric format indicator, specifying one or more characteristics of the telemetry metric report.

At step 512, the client information handling system may receive one or more corrective action instructions from the first information handling system for adjusting one or more characteristics that do not match the one or more predetermined characteristics. For example, the client information handling system may receive instructions to adjust one or more telemetry metric settings, such as implementing one or more telemetry metric report definitions, such that subsequently generated telemetry metric reports will have characteristics that match one or more predetermined characteristics of the client information handling system. The corrective action instructions received by the client information handling system at step 512 may, for example, be corrective action instructions transmitted by the first information handling system at step 310 of the method 300. After the telemetry metric instructions are received at step 512, the client information handling system may, at step 514, implement the corrective action instructions. For example, the client information handling system may alert a user of a mismatch between characteristics of a transmitted telemetry metric report and predetermined characteristics and/or may adjust one or more telemetry metric report settings to enable generation of telemetry metric reports having characteristics that match the predetermined characteristics.

Figure 6:
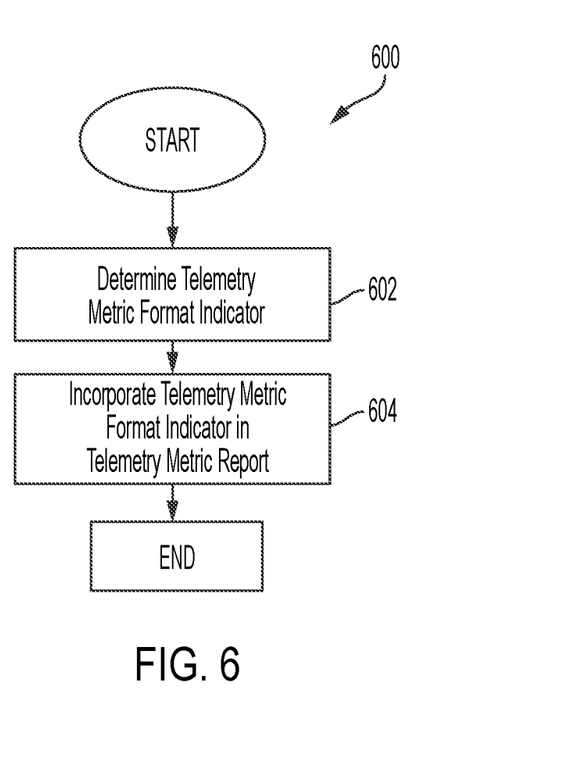
FIG. 6 is a flow chart diagram of an example method for determination of a telemetry metric format indicator and inclusion of a telemetry metric format indicator in a telemetry metric report according to some embodiments of the disclosure.

In some embodiments, a telemetry metric format indicator may be included in a telemetry metric report. An example method 600 for inclusion of a telemetry metric format indicator in a telemetry metric report is shown in FIG. 6. The method 600 may be performed as part of step 510 of the method 500. At step 602, the client information handling system may determine a telemetry metric format indicator indicating one or more telemetry metric report characteristics of a telemetry metric report to be transmitted. The telemetry metric format indicator may be an alphanumeric character indicating one or more characteristics of a telemetry metric report the indicator is to be transmitted in. For example, the telemetry metric format indicator may be generated based on one or more telemetry metric report settings of the client information handling system, such as based on one or more telemetry metric report definitions of the client information handling system. A unique telemetry metric format indicator may correspond to every combination of telemetry metric report characteristics, or every combination of integral telemetry metric report characteristics. In some embodiments, the telemetry metric report format indicator may be generated when the client information handling system is initialized, when one or more telemetry metric report settings is adjusted, or during generation of a telemetry metric report. Such generation may include selection of one or more integral telemetry metric report characteristics from amongst a plurality of telemetry metric report definitions, such as from amongst a combination of integral and optional telemetry metric report characteristics. The integral telemetry metric report characteristics may be marshalled to a json client to derive a subset text representative of the integral telemetry metric report characteristics. The client information handling system may then calculate an alphanumeric secure hash algorithm 256-bit (SHA-256) telemetry metric format indicator representing the integral telemetry metric report characteristics of the telemetry metric report to be transmitted.

At step 604, the telemetry metric format indicator may be incorporated in the telemetry metric report to be transmitted to the client information handling system. For example, the telemetry metric format indicator may be incorporated in the telemetry metric report to be transmitted at step 510 of method 500. In some embodiments, the telemetry metric format indicator may be referred to as a telemetry metric report definition digest. A firmware version of the client information handling system may also be included in the telemetry metric report.

Figure 7:
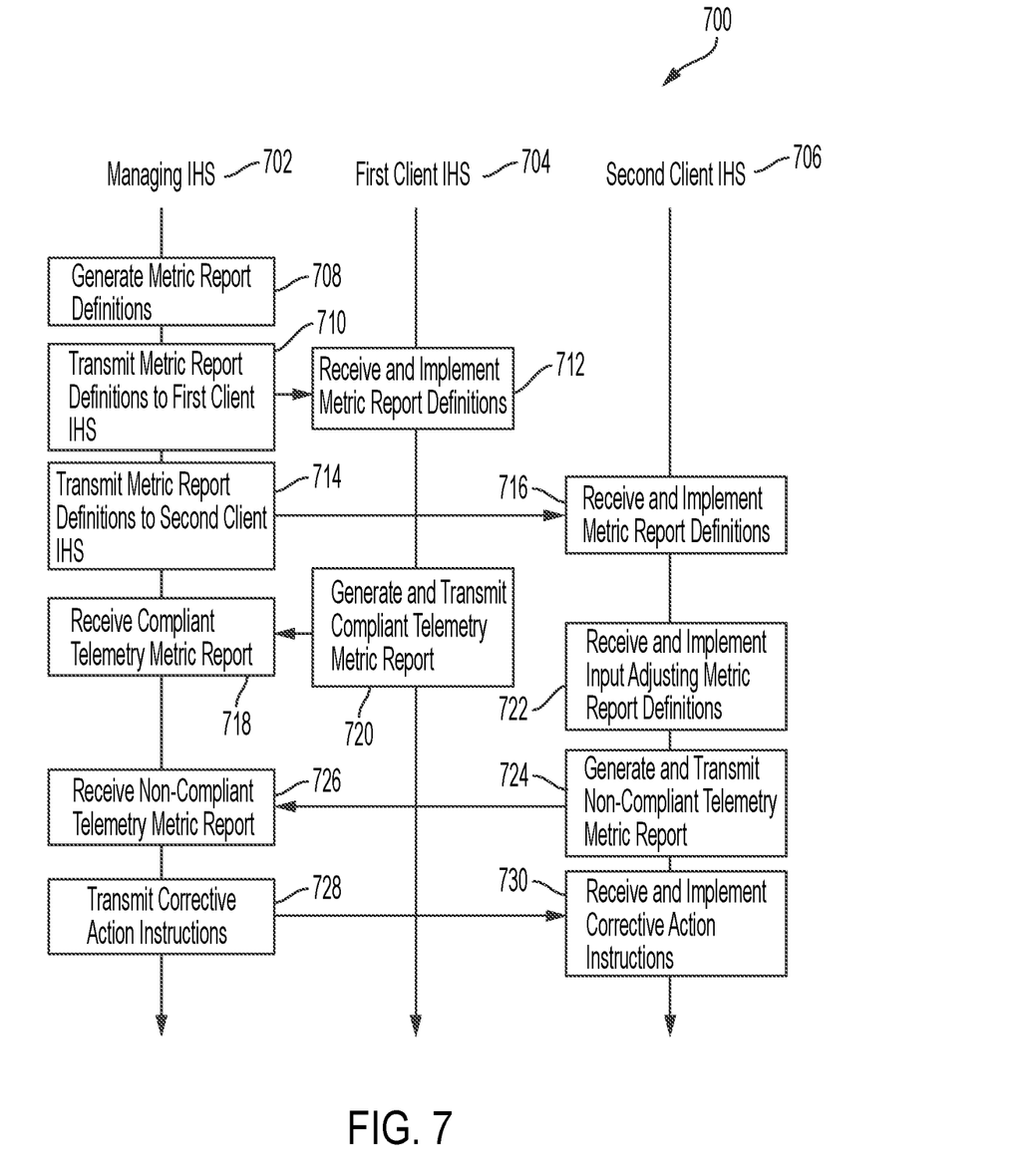
FIG. 7 is a process flow diagram of an example system for generation, transmission, receipt, and analysis of telemetry metric reports according to some embodiments of the disclosure.

A managing information handling system may communicate with multiple client information handling systems to monitor and to configure characteristics of telemetry metric reports transmitted from the client information handling systems to the managing information handling system. An example process flow diagram 700 including steps performed by a managing information handling system 702, a first client information handling system 704, and a second client information handling system 706. The managing information handling system 702 may, at step 708, generate one or more metric report definitions, such as telemetry metric report definitions. For example, the managing information handling system 702 may select one or more telemetry metric report characteristics to be implemented in telemetry metric reports generated by client information handling systems and may generate metric report definitions based on the desired characteristics. Telemetry metric report characteristics may, for example, include types of telemetry metric data to be included in a telemetry metric report and/or formatting details regarding organization and/or formatting of data in telemetry metric reports. In some embodiments, generation of the metric report definitions may include generation of a telemetry metric report definition digest, such as generation of an alphanumeric telemetry metric format indicator, indicating the one or more predetermined telemetry metric report definitions. In some embodiments, the telemetry metric report definitions may be stored by the managing information handling system. For example, the telemetry metric report definition digest may be stored by the client information handling system. The telemetry metric report definitions may be generated based on user input or may be generated automatically.

At step 710, the managing information handling system 702 may transmit the telemetry metric report definitions, such as the telemetry metric report definition digest, to the first client information handling system 704. For example, the managing information handling system 702 may instruct the client information handling system to implement the one or more telemetry metric report definitions generated at step 708. At step 712, the first client information handling system 704 may receive and implement the metric report definitions. For example, the first information handling system may receive the telemetry metric report definition digest, such as the telemetry metric format indicator, and may implement the telemetry metric report definitions identified by the telemetry metric report definition digest. For example, if the telemetry metric report definition digest is an alphanumeric string representing the one or more generated telemetry metric report definitions, the first client information handling system may determine one or more metric report definitions that should be implemented based on the alphanumeric string. Implementing the telemetry metric report definitions may include adjusting one or more telemetry metric report settings of the first client information handling system 704. For example, one or more telemetry metric report settings of the first client information handling system 704 may be adjusted to implement one or more telemetry metric report characteristics indicated by the received metric report definitions.

At step 714 the managing information handling system 702 may transmit the telemetry metric report definitions, such as by transmitting the telemetry metric report definition digest, to the second client information handling system 706. Such transmission may be similar to the transmission of the telemetry metric report definitions to the first client information handling system 704. In some embodiments, different telemetry metric report definitions may be generated for both the first client information handling system 704 and the second client information handling system 706. For example, the first client information handling system 704 and the second client information handling system 706 may have different telemetry metric data gathering capabilities, such as different sensing capabilities, and thus the managing information handling system 702 may specify different telemetry metric report definitions for each of the client information handling systems. At step 716, the second client information handling system 706 may receive and implement the telemetry metric report definitions. Such receipt and implementation may be similar to the receipt and implementation performed by the first client information handling system 704 at step 716.

At step 720, the first client information handling system 704 may generate and transmit a compliant telemetry metric report. For example, the first client information handling system may generate a telemetry metric report having the one or more characteristics specified by the metric report definitions received from the managing information handling system 702 at step 712. For example, the telemetry metric report may include telemetry metric data specified by the one or more metric report definitions in a format specified by the one or more metric report definitions. In some embodiments, the first client information handling system 704 may include a telemetry metric report definition digest, such as an alphanumeric telemetry metric format indicator, indicating one or more characteristics of the generated and transmitted telemetry metric report, in the telemetry metric report. At step 718, the managing information handling system 702 may receive the compliant telemetry metric report. In some embodiments, the managing information handling system 702 may extract the telemetry metric report definition digest from the received telemetry metric report and may compare it a telemetry metric report definition digest that was transmitted by the managing information handling system 702 at step 710 and stored by the managing information handling system 702. If the metric report definitions implemented at step 712 were not changed, the telemetry metric report definition digest of the received telemetry metric report may match the stored, predetermined, telemetry metric report definition digest. Thus, the one or more characteristics of the telemetry metric report may match the one or more predetermined characteristics indicated by the stored telemetry metric report definition digest. In some embodiments, when a determination is made that the telemetry metric report is compliant, the managing information handling system 702 may extract telemetry metric data and may forward the telemetry metric data to a remote information handling system, such as a cloud-based telemetry data aggregation server.

At step 722, the second client information handling system 706 may receive and implement input adjusting one or more metric report definitions. For example, the second client information handling system 706 may receive and implement input adjusting the one or more metric report definitions to be different from the one or more metric report definitions received and implemented at step 716. The second information handling system 706 may implement the received input by adjusting one or more telemetry metric report settings to adjust one or more characteristics of generated telemetry metric reports to be different from one or more characteristics indicated by the received telemetry metric report definitions. The received input may, for example, be user input adjusting one or more telemetry metric report settings. The received input may also be, for example, an update to a firmware of the second client information handling system 706. A firmware update to the second client information handling system 706 may, for example, introduce new telemetry data collection capabilities, such as new sensing capabilities, and may include an adjustment to one or more telemetry metric report settings to incorporate telemetry metric data collected using the new telemetry data collection capabilities.

At step 724, the second client information handling system may generate and transmit a non-compliant telemetry metric report. For example, the second client information handling system may generate a telemetry metric report having the one or more characteristics specified input received and implemented at step 722, and the one or more characteristics may be different from characteristics indicated by the telemetry metric definitions received at step 716. Thus, the transmitted report may be non-compliant with the telemetry metric definitions received from the managing information handling system 702 at step 716. In some embodiments, the second client information handling system 706 may include a telemetry metric report definition digest, such as an alphanumeric telemetry metric format indicator, indicating one or more characteristics of the generated and transmitted telemetry metric report, in the telemetry metric report. At step 726, the managing information handling system 702 may receive the non-compliant telemetry metric report. The managing information handling system 702 may also, at step 726, analyze the received non-compliant telemetry metric report to determine if the non-compliant telemetry metric report includes the one or more telemetry metric report characteristics specified by the telemetry metric report definitions transmitted at step 714. As the report received at step 726 is non-compliant, the managing information handling system 702 may determine that one or more characteristics of the telemetry metric report do not match the one or more predetermined characteristics indicated by the metric report definitions transmitted at step 714. In some embodiments, the managing information handling system 702 may extract a telemetry metric report definition digest from the received telemetry metric report and may compare it with a telemetry metric report definition digest that was transmitted by the managing information handling system 702 at step 714 and stored by the managing information handling system 702. Because one or more metric report definitions implemented at step 716 were changed at step 722, the telemetry metric report definition digest of the received telemetry metric report may not match the stored, predetermined, telemetry metric report definition digest. Thus, the one or more characteristics of the telemetry metric report may not match the one or more predetermined characteristics indicated by the stored telemetry metric report definition digest, and the received telemetry metric report may be non-compliant. Incorporation of the telemetry metric definition digest in telemetry metric reports may reduce system overhead by allowing determination of telemetry metric report characteristic drift without additional messaging between a managing information handling system and client information handling systems other than telemetry metric reports, telemetry metric definitions, and potential corrective action instructions.

In response to detection of receipt of a non-compliant telemetry metric report, the managing information handling system 702 may, at step 728 transmit one or more corrective action instructions. In some embodiments, transmission of one or more corrective action instructions may include notifying a user of the managing information handling system 702 or the second client information handling system 706 of the mismatch. For example, the managing information handling system may notify the user that definitions of the telemetry metric report may have been tampered with, such as by a user at step 722. Transmission of corrective action instructions at step 728 may include transmission of instructions to implement the metric report definitions generated at step 708. For example, the managing information handling system 702 may retransmit a telemetry metric report definition digest that was transmitted to the second client information handling system 702 at step 714, instructing the second client information handling system 706 to implement the one or more definitions generated at step 708. At step 730, the second client information handling system 706 may receive and implement the corrective action instructions. For example, the second client information handling system may adjust one or more telemetry metric report definitions to match the metric report definitions received at step 716 in response to the instructions. In some embodiments, such adjustments may include adjusting one or more telemetry metric report settings. For example, telemetry metric report definitions may be adjusted to be different from the metric report definitions implemented in response to the input received at step 722. Thus, the managing information handling system 702 may override, in response to a received non-compliant telemetry metric report, input adjusting telemetry metric report definitions received by the second client information handling system and may instruct the second client information handling system 706 to implement telemetry metric report definitions as instructed by the managing information handling system 702.

The flow chart diagrams of FIGS. 3-7 are generally set forth as logical flow chart or process flow diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving, by a first information handling system, a telemetry metric report from a client information handling system;
   determining, by the first information handling system, that one or more characteristics of the telemetry metric report do not match one or more predetermined telemetry metric report characteristics, by comparing a received telemetry metric format indicator of the received telemetry metric report representing the one or more characteristics of the telemetry metric report with a stored telemetry metric format indicator representing the one or more predetermined telemetry metric report characteristics; and
   performing, by the first information handling system, one or more corrective actions based, at least in part, on the determination that the one or more characteristics of the telemetry metric report do not match one or more predetermined telemetry metric report characteristics.

2. The method of claim 1, wherein the one or more corrective actions comprise at least one of:
   notifying a user of at least one of the first information handling system or the client information handling system that the one or more characteristics of the telemetry metric report do not match one or more predetermined telemetry metric report characteristics; or
   instructing the client information handling system to implement telemetry metric report characteristics that match the one or more predetermined telemetry metric report characteristics.

3. The method of claim 1, further comprising:
   transmitting, by the first information handling system to the client information handling system, a telemetry metric report definition identifying the one or more predetermined telemetry metric report characteristics; and
   storing, by the first information handling system, the transmitted telemetry metric report definition.

4. The method of claim 1, wherein determining, by the first information handling system, that one or more characteristics of the telemetry metric report do not match one or more predetermined telemetry metric report characteristics further comprises selecting a stored telemetry metric format indicator representing the one or more predetermined telemetry metric report characteristics for comparison based, at least in part, on a firmware version indicator of the received telemetry metric report indicating a firmware version of the client information handling system.

5. The method of claim 1, wherein determining, by the first information handling system, that one or more characteristics of the telemetry metric report do not match one or more predetermined telemetry metric report characteristics comprises determining the one or more predetermined telemetry metric report characteristics based, at least in part, on one or more integral metric report definitions of a metric report definition digest stored by the first information handling system.

6. The method of claim 1, wherein receiving the telemetry metric report comprises receiving a portion of a telemetry metric data stream.

7. The method of claim 1, wherein the telemetry metric format indicator comprises an alphanumeric string of characters representing one or more integral report definitions of the telemetry metric report.

8. A first information handling system, comprising:
   a processor; and
   a memory,
   wherein the processor is configured to perform steps comprising:
      receiving, by the first information handling system, a telemetry metric report from a client information handling system;
      determining, by the first information handling system, that one or more characteristics of the telemetry metric report do not match one or more predetermined telemetry metric report characteristics, by comparing a received telemetry metric format indicator of the received telemetry metric report representing the one or more characteristics of the telemetry metric report with a stored telemetry metric format indicator representing the one or more predetermined telemetry metric report characteristics; and performing, by the first information handling system, one or more corrective actions based, at least in part, on the determination that the one or more characteristics of the telemetry metric report do not match one or more predetermined telemetry metric report characteristics.

9. The information handling system of claim 8, wherein the one or more corrective actions comprise at least one of:
notifying a user of at least one of the first information handling system or the client information handling system that the one or more characteristics of the telemetry metric report do not match one or more predetermined telemetry metric report characteristics; or instructing the client information handling system to implement telemetry metric report characteristics that match the one or more predetermined telemetry metric report characteristics.

10. The information handling system of claim 8, wherein the processor is further configured to perform steps further comprising:
transmitting, by the first information handling system to the client information handling system, a telemetry metric report definition identifying the one or more predetermined telemetry metric report characteristics; and storing, by the first information handling system, the transmitted telemetry metric report definition.

11. The information handling system of claim 8, wherein determining, by the first information handling system, that one or more characteristics of the telemetry metric report do not match one or more predetermined telemetry metric report characteristics comprises comparing a received telemetry metric format indicator representing the one or more characteristics of the telemetry metric report with a stored telemetry metric format indicator representing the one or more predetermined telemetry metric report characteristics.

12. The information handling system of claim 8, wherein determining, by the first information handling system, that one or more characteristics of the telemetry metric report do not match one or more predetermined telemetry metric report characteristics comprises determining the one or more predetermined telemetry metric report characteristics based, at least in part, on one or more integral metric report definitions of a metric report definition digest stored by the first information handling system.

13. The information handling system of claim 8, wherein receiving the telemetry metric report comprises receiving a portion of a telemetry metric data stream.

14. The first information handling system of claim 8, wherein the telemetry metric format indicator comprises an alphanumeric string of characters representing one or more integral report definitions of the telemetry metric report.

15. A method, comprising:
generating, by a client information handling system, a telemetry metric report for a first information handling system based, at least in part, on telemetry metric data collected by the client information handling system, wherein the telemetry metric report includes a telemetry metric format indicator;

transmitting, by the client information handling system, the telemetry metric report to the first information handling system;

receiving, by the client information handling system from the first information handling system, one or more corrective action instructions for adjusting one or more telemetry metric report settings, wherein one or more telemetry metric report characteristics are based, at least in part, on the one or more telemetry metric report settings; and implementing, by the client information handling system, the one or more corrective action instructions.

16. The method of claim 15, further comprising transmitting, by the client information handling system, a second telemetry metric report having the one or more telemetry metric report characteristics adjusted based, at least in part, on the received one or more corrective action instructions.

17. The method of claim 15, wherein generating the telemetry metric report comprises:
determining the telemetry metric format indicator representing the one or more characteristics of the telemetry metric report; and including the determined telemetry metric format indicator in the telemetry metric report.

18. The method of claim 17, further comprising:
including a firmware version of the client information handling system in the telemetry metric report.

19. The method of claim 15, further comprising:
receiving, by the client information handling system from the first information handling system, a message including one or more predetermined characteristics for the telemetry metric report;

adjusting, by the client information handling system, the one or more telemetry metric report settings for generation of the telemetry metric report based, at least in part, on the received predetermined characteristics for the telemetry metric report;

receiving, by the client information handling system, user input identifying one or more changes to the one or telemetry metric report settings adjusted based on the received predetermined characteristics; and adjusting, by the client information handling system, the one or more telemetry metric report settings based, at least in part, on the user input, wherein the generated telemetry metric report is generated with the one or more telemetry metric report characteristics based, at least in part, on the adjustment to the one or more telemetry metric report settings based, at least in part, on the user input.

20. The method of claim 15, wherein the transmitted telemetry metric report is part of a telemetry metric data stream.

* * * * *